United States Patent [19]

Takahira

[11] Patent Number: 5,157,247
[45] Date of Patent: Oct. 20, 1992

[54] IC CARD

[75] Inventor: Kenichi Takahira, Itami, Japan

[73] Assignee: Mitsubishi Denki Kabushiki Kaisha, Tokyo, Japan

[21] Appl. No.: 617,009

[22] Filed: Nov. 21, 1990

[30] Foreign Application Priority Data

Jul. 17, 1990 [JP] Japan .................. 2-187035

[51] Int. Cl.⁵ .................. G06K 19/06; G06K 5/00; G01N 27/416
[52] U.S. Cl. .................. 235/492; 235/380; 235/382; 324/428; 324/433
[58] Field of Search ............... 235/380, 472, 382, 492, 235/441; 320/13, 37, 38; 315/241 P, 241 S; 324/433, 426, 427, 428; 340/636, 661, 663

[56] References Cited

U.S. PATENT DOCUMENTS

| | | | |
|---|---|---|---|
| 4,785,166 | 11/1988 | Kushima | 235/380 |
| 4,794,236 | 12/1988 | Kawana et al. | 235/436 |
| 4,800,255 | 1/1989 | Imran | 235/382 |
| 4,816,656 | 3/1989 | Nakano et al. | 235/380 |
| 4,839,597 | 6/1989 | Rowland | 324/433 |
| 4,843,224 | 6/1989 | Ohta et al. | 235/487 |
| 4,866,389 | 9/1989 | Ryan et al. | 324/433 |

FOREIGN PATENT DOCUMENTS

| | | | |
|---|---|---|---|
| 62-159395 | 7/1987 | Japan . | |
| 0273979 | 11/1988 | Japan | 235/380 |
| 1120609 | 5/1989 | Japan . | |
| 1126790 | 5/1989 | Japan . | |
| 296209 | 4/1990 | Japan . | |

Primary Examiner—John W. Shepperd
Assistant Examiner—Tan Nguyen
Attorney, Agent, or Firm—Leydig, Voit & Mayer

[57] ABSTRACT

An IC card has a data transmission/receiving circuit for exchanging data with an external device, a data processing circuit connected to the data transmission/receiving circuit for processing the data, a battery for supplying the data transmission/receiving circuit and the data processing circuit with electrical power, a charge storage device such as a capacitor charged at a predetermined time constant by the battery, a charge control circuit for controlling connection of the battery to the charge storage device in accordance with a control signal from the data processing circuit, a comparator circuit for comparing the output voltage from the charge storage device with a reference value, and a time measuring counter for measuring the time from electrical connection of the battery to the charge storage device until the comparator circuit detects an output voltage from the charge storage circuit exceeding the reference value.

8 Claims, 9 Drawing Sheets

IC CARD

BACKGROUND OF THE INVENTION

1. Field of the Invention

The present invention relates to an IC card and, more particularly, to a non-contact type IC card having a microcomputer incorporating a data memory, a battery and other built-in components.

2. Description of the Related Art

In recent years, non-contact type IC cards have been developed which have various built-in components such as a data processing CPU, a data memory for storing data, a transmission/receiving device for exchange of data with external devices, a battery for supplying power to internal circuits, and so forth. It is desirable that this type of IC card have a voltage detection circuit for detecting a reduction in the voltage of the built-in battery.

A voltage detection circuit for this purpose is already known. This known circuit has a Zener diode for generating a reference voltage by using the power of the built-in battery, a resistor for dividing the potential or output voltage of the battery, and means for comparing the measured divided voltage with the reference voltage so as to produce a signal when the measured voltage has become lower than the reference voltage.

This known voltage detection circuit, however, has suffered from a problem in that different circuits have different levels of voltage detection so that the accuracy of the voltage detection is not so high, due to fluctuations in the properties of the components such as the Zener diode and the voltage-dividing resistor.

SUMMARY OF THE INVENTION

Accordingly, an object of the present invention is to provide an IC card which can detect a drop in the voltage of the built-in battery with a high degree of accuracy, thereby overcoming the above-described problems of the prior art.

To this end, according to a first aspect of the present invention, there is provided an IC card comprising: data transmission/receiving means for exchanging data with an external device; data processing means connected to the data transmission/receiving means for processing the data; a battery for supplying the data transmission/receiving means and the data processing means with electrical power; charge means which is charged at a predetermined time constant by power from the battery; charging control means for controlling the state of a connection between the battery and the charge means in accordance with a control signal from the data processing means; comparator means for comparing the output voltage from the charge means with a reference value; and time measuring means for measuring the time from a moment at which an electrical connection between the battery and the charge means is completed by the charging control means to a moment at which the comparator means detects an output voltage from the charge means exceeding the reference value.

According to a second aspect of the present invention, there is provided an IC card comprising: data transmission/receiving means for exchanging data with an external device; data processing means connected to the data transmission/receiving means for processing the data; a battery for supplying the data transmission/receiving means and the data processing means with electrical power; a plurality of charge means which are charged with different time constants by power from the battery; charging control means for selectively connecting the battery to one of the charge means in accordance with a control signal from the data processing means; comparator means for comparing the output voltage from the charge means connected to the battery by the charging control means with a reference value; and time measuring means for measuring the time from a moment at which an electrical connection between the battery and the charge means is completed by the charging control means to a moment at which the comparator means detects an output voltage from the charge means exceeding the reference value.

In the first aspect of the invention, the charging control means connects the battery to the charge means in accordance with the control signal output from the data processing means, and the comparator means compares the output voltage of the charge means charged by the battery with the reference value. The time measuring means then measures the time from a moment at which the charging of the charge means is commenced untill the moment at which the output voltage of the charge means exceeds the reference value.

In the second aspect of the invention, the charging control means connects the battery to one of the plurality of the charge means in accordance with the control signal output from the data processing means, and the comparator means compares the output voltage of the charge means connected to and charged by the battery with the reference value. The time measuring means then measures the time from a moment at which the charging of the charge means is commenced untill the moment at which the output voltage of the charge means exceeds the reference value.

DESCRIPTION OF THE PREFERRED EMBODIMENTS

Preferred embodiments of the present invention will be described hereinunder with reference to the accompanying drawings.

Figure 1:
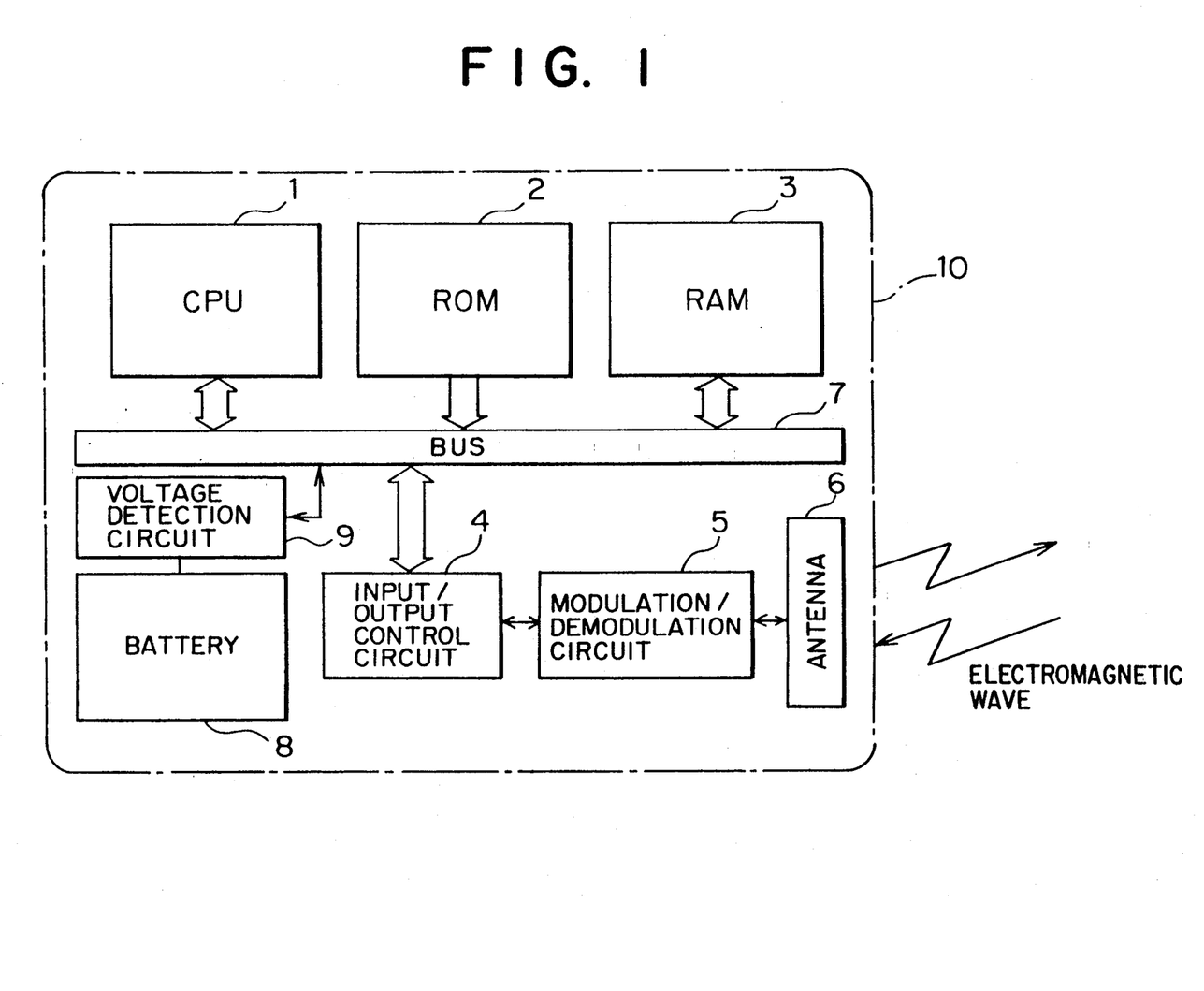
FIG. 1 is a block diagram of an IC card in accordance with a first embodiment of the present invention.

Referring first to FIG. 1, an IC card 10 has a central processing unit (CPU) which conducts various controls in the card 10. A BUS 7 leading from the CPU 1 is connected to a read only memory (ROM) 2 for storing the control programs to be executed by the CPU 1, a random access memory (RAM) 3 for storing various data, and an input/output control circuit 4 for controlling exchange of serial data between the IC card 10 and external devices (not shown). A modulation/demodulation circuit 5 is connected at one end to the input/output control circuit 4 and at another end to an antenna 6. The IC card 10 also incorporates a built-in battery 8 for supplying various internal electric circuits with electric power. A voltage detection circuit 9 for monitoring the voltage of the battery 8 is connected to the BUS 7.

In the IC card 10 having the described components, all the circuits or components except the battery 8 are formed on a single IC chip. The modulation/demodulation circuit 5 and the antenna 6 in cooperation form data transmission/receiving means, while CPU 1 serves as data processing means. The CPU 1 also serve as alarm means, mean value computing means, and reduction rate computing means.

A description will now be given of a data transmission/receiving operation performed by the IC card 10. When an electromagnetic wave carrying an input signal from an external device (not shown) is received by the antenna 6, this signal is digitized by the modulation/demodulation circuit 5 and is then input to the CPU 1 through the input/output control circuit 4. The CPU 1 processes the input signal in accordance with the program stored in the ROM 2 and stores the data in the RAM 3 as required. Data for responding to the external device, e.g., the result of a computation, is input to the modulation/demodulation circuit 5 through the input/output control circuit 4 and changed into an analog signal. The analog signal is then transmitted in the form of an electromagnetic wave from the antenna 6.

As a result of the repeated transmission and receipt of data, the power stored in the built-in battery 8 of the IC card 10 is progressively consumed so that the voltage of the battery 8 becomes lower. The IC card 10 can no longer operate safely when the voltage of the battery 8 declines below a predetermined level. The voltage of the battery 8 is therefore continuously monitored by the voltage detection circuit 9.

Figure 2:
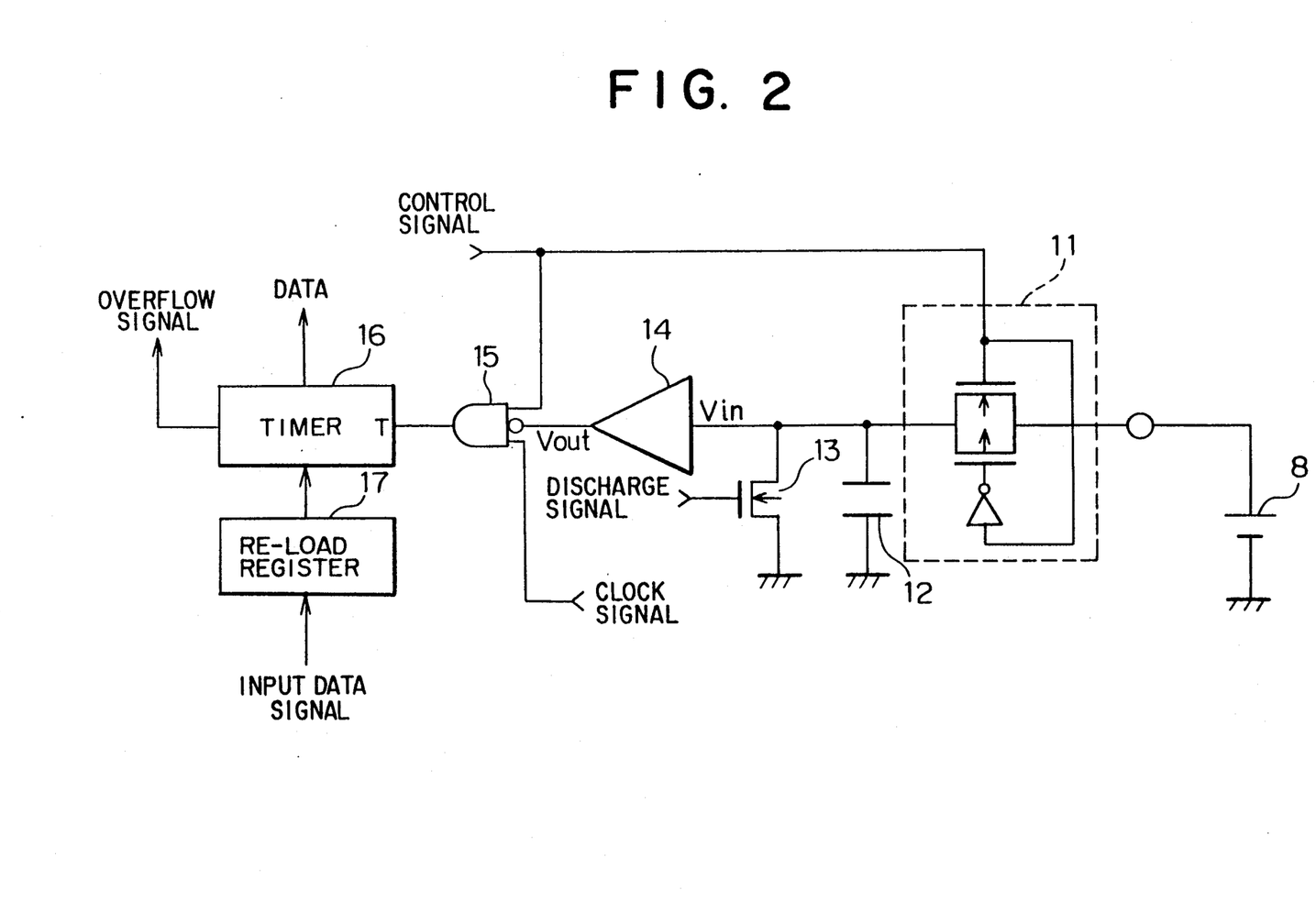
FIG. 2 is a circuit diagram of a voltage detection circuit incorporated in the IC card shown in FIG. 1.

FIG. 2 shows the internal structure of the voltage detection circuit 9. The voltage detection circuit 9 has a transmission gate 11 connected to the battery 8 and forming a charging control means. A control signal for controlling the operation of the voltage detection circuit 9 is delivered by the CPU 1 to the transmission gate 11. When the level of this control signal is "L", the transmission gate 11 is turned off, whereas, when the signal level is "H", it becomes conductive and exhibits a predetermined load resistance R. A capacitor 12 serving as charging means and a transistor 13 for discharging are connected between the output of the transmission gate 11 and the ground. A voltage comparator gate 14 serving as comparator means is connected to the output terminal of the transmission gate 11. When the input voltage $V_{in}$ supplied to the voltage comparator gate 14 is lower than a predetermined threshold voltage $V_{th}$, the voltage comparator gate 14 produces an output voltage $V_{out}$ of "L" level, whereas, when the input voltage $V_{in}$ is equal to or higher than the threshold voltage $V_{th}$, it delivers an output voltage $V_{out}$ of "H" level. The threshold voltage $V_{th}$ is determined in relation to the initial voltage $V_{SBO}$ of the battery 8 so as to meet the following condition:

$$0 < V_{th} < V_{BO}$$

A timer 16 is connected to the output terminal of the voltage comparator gate 14 through a logical gate 15 which receives a signal formed by inversion of the output from the voltage comparator gate 14, as well as a control signal and a clock signal from the CPU 1. A re-load register 17 for setting the initial value of the timer 16 is connected to the timer 16. The logical gate 15 and the timer 16 in cooperation form time measuring means, while the re-load register 17 serves as initial value setting means. The timer 16 also serves as an overflow signal generating means.

The operation of the voltage detection circuit 9 will be described with reference to a flow chart shown in FIG. 3. In Step 31, an input data signal is delivered from the CPU 1 to the timer 16 and the re-load register 17 so as to set "0" in the timer 16 and the re-load register 17. In Step 32, the CPU 1 sets the control signal to "L" level so as to turn off the transmission gate 11. In this state, Step 33 is executed in which a discharge signal pulse is delivered from the CPU 1 to the transistor 13 so as to temporarily turn the transistor 13 on, thus allowing the capacitor 12 to discharge. As a consequence, the input voltage $V_{in}$ of the voltage comparator gate 14 is reduced to zero. Since the input voltage $V_{in}$ becomes lower than the threshold voltage $V_{th}$, the output voltage $V_{out}$ of the voltage comparator gate 14 is set to "L" level.

In Step 34, the CPU 1 delivers a clock signal to the logical gate 15 and in Step 35, it delivers a control signal of "H" level both to the transmission gate 11 and the logical gate 15. Consequently, the transmission gate 11 becomes conductive, so that an electric current of a level determined by the load resistance R set in the transmission gate 11 is supplied to the capacitor 12, thus initiating the charging of the capacitor 12. Meanwhile, since both the control signal and the inverted output from the voltage comparator gate 14 received by the logical circuit 15 are "H" level, the clock signal is supplied to the timer 16 through the logical gate 15, so that the timer 16 starts its count-up operation in accordance with the clock signal in Step 36.

Representing the voltage of the battery 8 by $V_{BE}$ and the electrostatic capacitance of the capacitor 12 by C, the voltage $V_C$ of the capacitor 12, which is being charged by the charging current supplied through the transmission gate 11, is represented by the following function of time. Thus, the voltage increases as time elapses.

$$V_C = V_{BE}(1 - e^{(-t/CR)}) \tag{1}$$

This voltage $V_C$ of the capacitor 12 is received by the voltage comparator gate 14. Therefore, when the voltage $V_C$ reaches the threshold voltage $V_{th}$ of the voltage comparator gate 14, the output voltage $V_{out}$ of the voltage comparator gate 14 is changed to "H" level. As the output voltage $V_{out}$ is set to "H" level in Step 37, the output of the logical circuit 15 is set to "L" level so that the timer 16 stops the counting operation in Step 38. Subsequently, the CPU 1 stops the delivery of the clock signal in Step 39 and sets the control signal to "L" level in Step 40.

Then, Step 41 is executed in which the CPU 1 reads the measured time value $t_m$ from the timer 16. The following condition is obtained by substituting the measured time value $t_m$ in the formula (1).

$$V_{th} = V_{BE}(1 - e^{(-t_m/CR)}) \tag{2}$$

The voltage $V_{BE}$ of the battery 8 is therefore expressed as follows:

$$V_{BE} = V_{th}/(1 - e^{(-tm/CR)}) \quad (3)$$

It is thus possible to compute the voltage $V_{BE}$ of the battery 8.

In the first embodiment described hereinbefore, the measured time value $t_m$ is read directly from the timer 16. In a second embodiment which will be described hereinafter, whether the time measured by the timer 16 exceeds a predetermined value is determined and an alarm signal is produced in accordance with the result of the determination. The second embodiment will be described with reference to a flowchart shown in FIG. 4.

Figure 4:
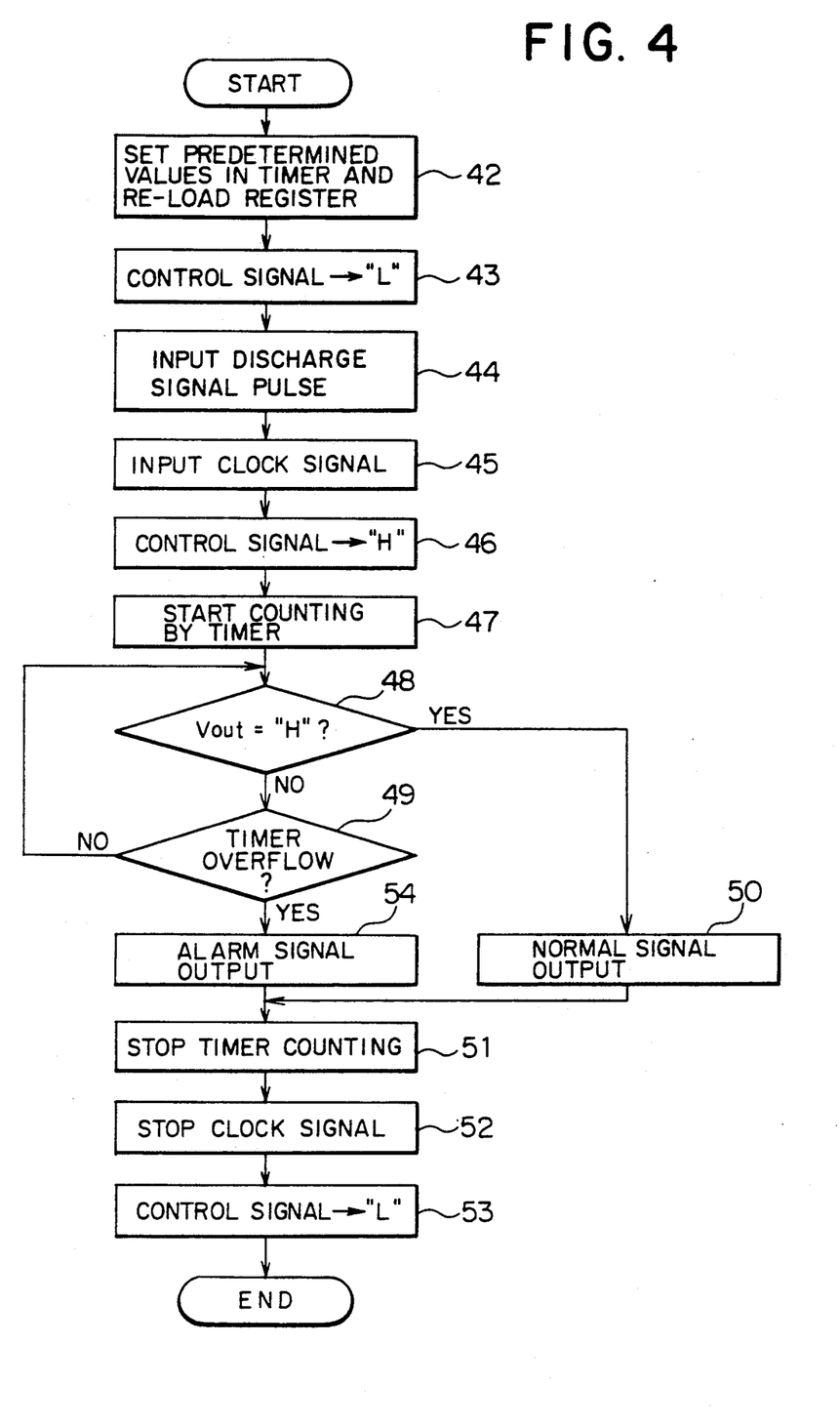
FIG. 4 is a flow chart illustrative of the operation of a second embodiment of the invention.

An initial value $t_1$ of the timer 16 is beforehand stored in a predetermined area of the RAM 3. In Step 42, the CPU 1 reads this initial value $T_1$ from the RAM 3 and sets the initial value $t_1$ in the timer 16 and in the re-load register 17 by delivering an input data signal.

Subsequently, in Step 43, the CPU 1 sets the control signal to "L" level to turn off the transmission gate 11 and, in Step 44, the CPU 1 delivers a discharge signal pulse to the transistor 13 thereby causing the capacitor 12 to discharge. Subsequently, in Step 45, the CPU 1 applies a clock signal to the logical gate 15 and applies a control signal of "H" level to the transmission gate 11 and the logical gate 15 in Step 46. As a consequence, the charging of the capacitor 12 is commenced and in Step 47, the timer 16 commences the counting operation in accordance with the clock signal.

In Step 48, whether the output voltage $V_{out}$ of the voltage comparator gate 14 has been set to "H" level is determined. If the answer is NO, i.e., if the output voltage $V_{out}$ has not changed to "H" level, the process proceeds to Step 49 in which a test is made to determine whether an overflow signal has been produced by the timer 16. Thus, the timer 16 continues the counting operation until the output voltage Vout of the voltage comparator gate 14 becomes "H" level or until the timer 16 overflows.

If the output voltage $V_{out}$ of the voltage comparator circuit 14 is changed to "H" level before an overflow of the timer 16, the CPU 1 determines that the voltage $V_{BE}$ of the battery 8 is still high enough and delivers a normal signal indicative of normal state of the battery 8 to the un-illustrated external device in Step 50. In this state, the output of the logical gate 15 is set to "L" level so that the timer 16 stops the counting operation in Step 51. Furthermore, the CPU 1 stops the clock signal in Step 52 and sets the control signal to "L" level in Step 53.

Conversely, if the timer 16 overflows before the change of the output voltage $V_{out}$ of the voltage comparator circuit 14 to "H" level, the CPU 1 determines that too long time is required for charging the capacitor 12 i.e., that the voltage $V_{BE}$ of the battery 8 is too low. The process then proceeds to Step 54 in which the CPU 1 delivers to the external device an alarm signal indicative of the abnormal state of the battery 8. The process then proceeds to Step 51.

In the second embodiment as described, the external device can detect the reduction of voltage of the battery 8 in the IC card through the reception of the alarm signal delivered from the IC card, thus facilitating execution of a suitable countermeasure such as replacement of the battery 8, storage of the data stored in the IC card, and so forth.

Figure 5:
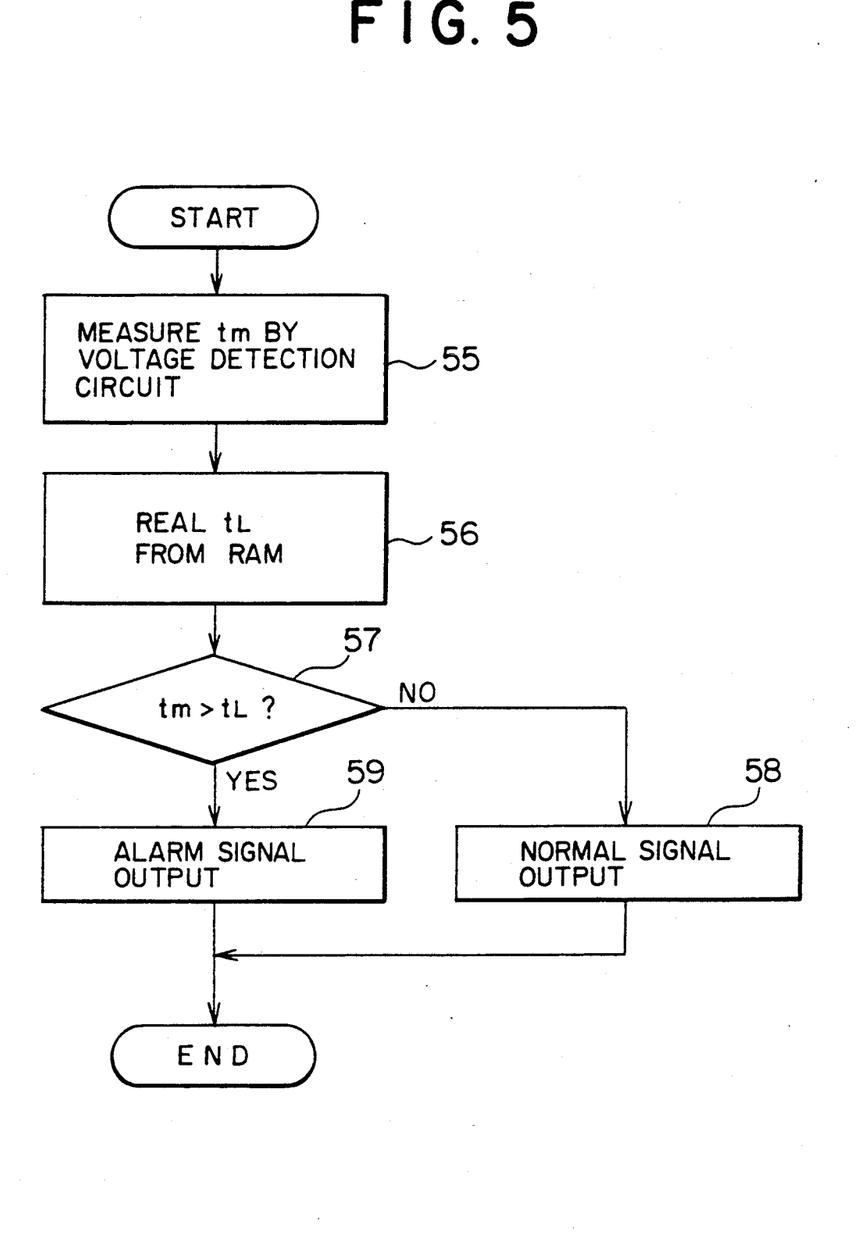
FIG. 5 is a flow chart illustrative of the operation of a third embodiment of the invention.

FIG. 5 shows the operation of a third embodiment of the present invention. In this embodiment, a standard time $t_L$ for generating an alarm signal is stored in a predetermined area of the RAM 3. The time value $t_m$ is measured in Step 55, in the same way as th measurement of the first embodiment, i.e., the flowchart shown in FIG. 3. In Step 56, the CPU 1 reads the standard time $t_L$ from the RAM 3 and then compares it with the measured time value $t_m$ in Step 57. When the condition tm $\leq t_L$ is met, the CPU 1 determines that the voltage $V_{BE}$ of the battery 8 is still high and delivers a normal signal to the external device (not shown) in Step 58. However, when the condition $t_m > t_L$ is met, the CPU 1 determines that the voltage $V_{BE}$ of the battery 8 is low and delivers an alarm signal to the external device in Step 59.

Figure 6:
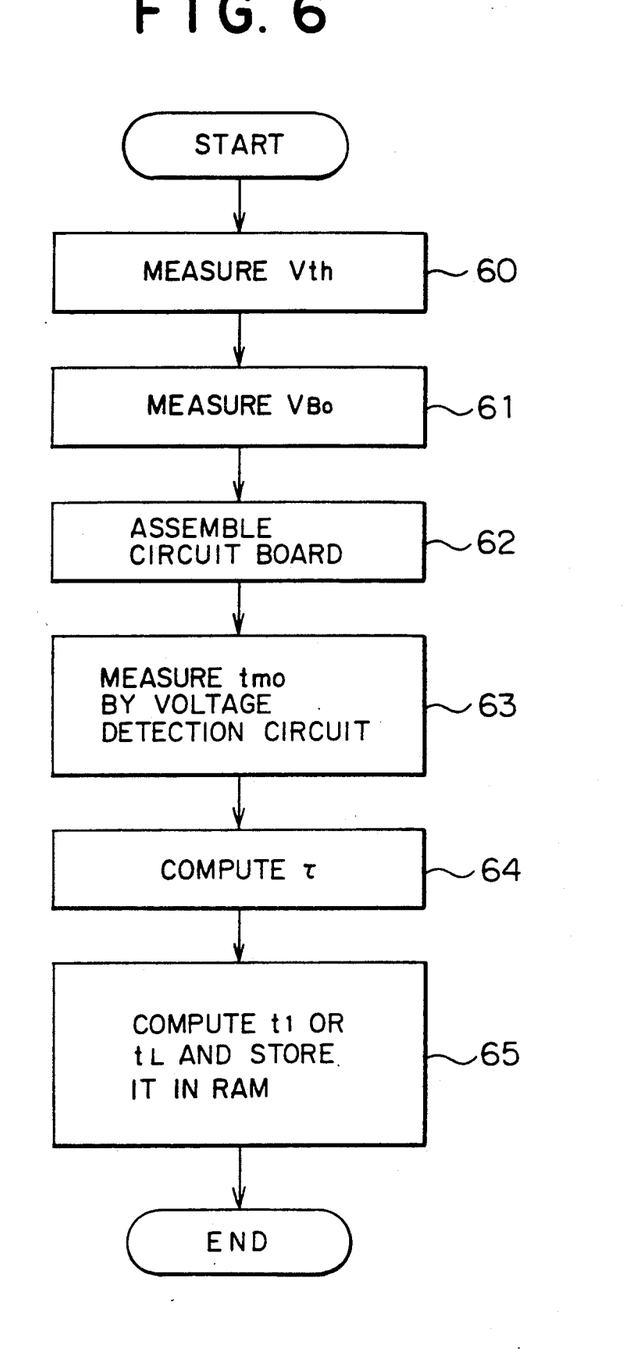
FIG. 6 is a flow chart illustrating a process for setting a timer to an initial value or to a standard time in the second and third embodiments.

A description will now be given of the method for setting the initial value $t_1$ used in the second embodiment or the standard time $t_L$ used in the third embodiment, with specific reference to a flow chart shown in FIG. 6.

This setting is executed only once in the course of the production of the IC card. In Step 60, the threshold voltage $V_{th}$ of the voltage comparator circuit 14 before connection to the voltage detection circuit 9 is measured. This Step 60 is executed for the purpose of compensating for any error between the design value and the actual value of the threshold voltage $V_{th}$ and, therefore, may be omitted when the error is negligibly small. In Step 61, the initial voltage $V_{BO}$ of the battery 8 before the mounting in the IC card is measured.

Subsequently, in Step 62, the battery 8 and the circuits are mounted on the circuit board of the IC card in Step 62. In Step 63, the time value $t_{mo}$ in this initial state is measured by the voltage detection circuit 9. This measurement is conducted in accordance with the flow-chart shown in FIG. 3. The threshold voltage $V_{th}$, the initial voltage $V_{BO}$ and the time value $t_{mO}$ are substituted in formula (2) so that the time constant $\tau$ is computed as the product CR of the capacitance C of the capacitor 12 and the load resistance R of the transmission gate 11. It will be seen that the initial time voltage $V_{BO}$ and the initial time value $t_{mO}$ are substituted for the voltage VBE and the time value $t_m$ in the formula (2), respectively. The computation of the time constant $\tau$ takes into account the difference between the design value and the actual value. Therefore, Steps 61 to 64 may be omitted if the error is negligible.

In Step 65, the initial value $t_I$ of the timer 16 or the standard time $t_L$ is calculated in accordance with the formula (2) by using the threshold voltage $V_{th}$ and the time constant $\tau$ computed in Steps 60 and 64, on an assumption of 1 battery voltage $V_{Bl}$ at which the alarm is to be produced. The initial value $t_I$ or the standard time $t_L$ is then written in the RAM 3.

Figure 3:
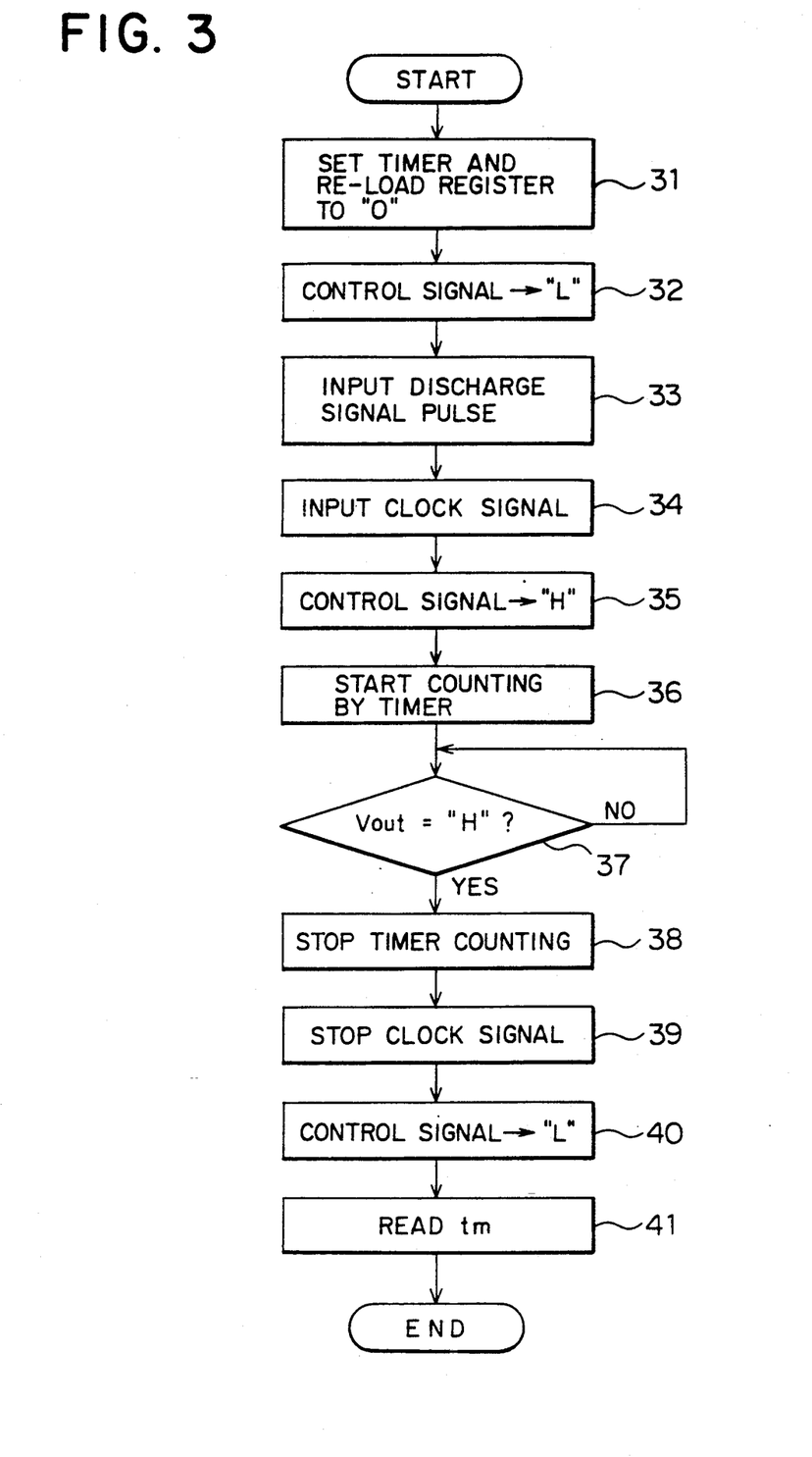
FIG. 3 is a flowchart illustrative of the operation of the voltage detection circuit shown in FIG. 2.

The time value $t_m$ measured in accordance with the flow chart of FIG. 3 becomes progressively greater than the initial time value $t_{mO}$ as the power of the battery 8 is consumed. It is therefore possible to determine the standard time $t_L$ by computing a predetermined fixed value $t_c$ from the design value and adding it to the initial time value $t_{mO}$ obtained in Step 63 of the flow chart shown in FIG. 6. It is also possible to determine the initial timer value $t_I$ from this standard time $t_L$.

It is also possible to store a plurality of the timer initial values $t_I$ or the standard times $t_L$ in the RAM and to generate different types of alarm signals in accordance with different values of the timer initial value $t_I$ or the standard time $t_L$. This arrangement makes it possible to observe and monitor the reduction of the battery of the voltage 8 in a plurality of stages.

Figure 7:
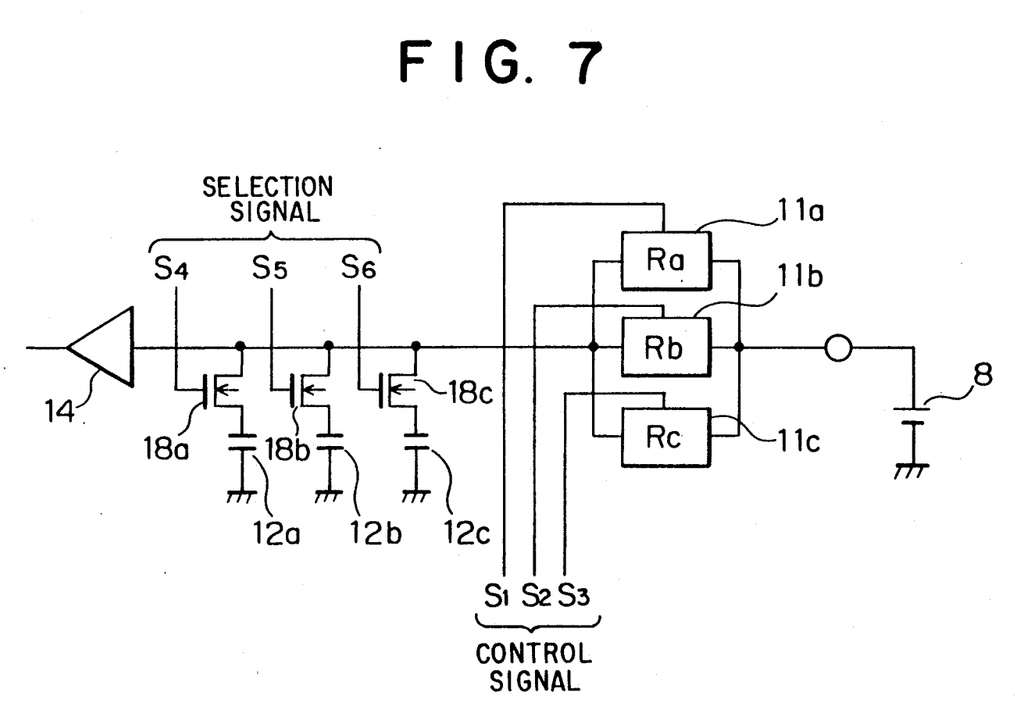
FIG. 7 is a circuit diagram of a major portion of a voltage detection circuit used in a fourth embodiment.

FIG. 7 shows the major portion of a voltage detection circuit in a fourth embodiment of the present invention. In this fourth embodiment, three transmission gates 11a, 11b, 11c having different load resistance values Ra, Rb, Rc are connected in parallel with one another and controlled by independent control signals $S_1$, $S_2$, $S_3$, respectively. At the same time, three capacitors 12a, 12b, 12c having different capacitance values are connected in parallel with one another and transistors 18a, 18b, 18c are connected in series with the respective capacitors 12a, 12b, 12c. The transistors 18a, 18b, 18c are turned on and off in accordance with independent selection signals $S_4$, $S_5$, $S_6$. It is therefore possible to change the time constant $\tau$ by selecting one of the control signals S1, S2, S3 and one of the selecting one of the control signals $S_4$, $S_5$, $S_6$ in the operation of the CPU 1. Thus, the level of detection of battery voltage can be freely changed in accordance with a change in the factors such as the range of the timer 16, clock frequency, type of the battery 8 and the detection accuracy.

Figure 8:
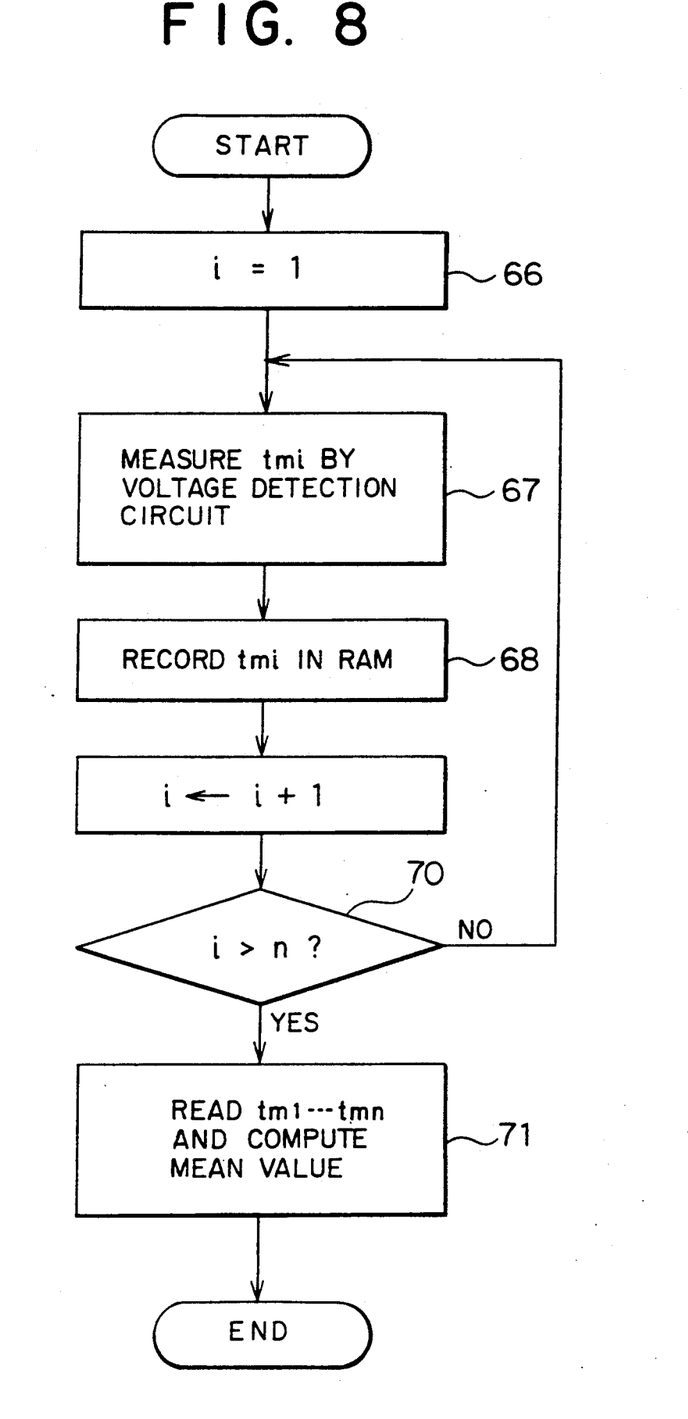
FIG. 8 is a flow chart illustrative of the operation of a fifth embodiment of the invention.

FIG. 8 illustrates the operation of a fifth embodiment of the present invention. In this embodiment, the voltage detection circuit 9 consecutively measures the time a plurality of times and determines the mean of the measured time values. In Step 66, the CPU 1 sets a value $i = 1$ and, in Step 67, measures the first cycle to a time value $t_{mi}$. This measurement is executed n accordance with the flow chart shown in FIG. 3. In Step 68, the CPU 1 stores the measured time value $t_{mi}$ in the RAM 3 and, in Step 69, the CPU 1 increments the value of i by one. Then, Steps 67 to 69 are repeatedly conducted until the value of i exceeds a predetermined number n.

In Step 70, when the CPU 1 has judged that the value of i has exceeded the predetermined value n, the CPU determines that n cycles of time measurement have been completed, and proceeds with the process to Step 71. In this Step, the CPU 1 reads the measured time values $t_{ml}$ to $t_{mn}$ from the RAM 3 and computes the mean of these time values.

By using the mean value over the measuring cycles, it is possible to accurately detect the voltage reduction without any influence from fluctuation in the measurements in each measuring cycle.

Figure 9:
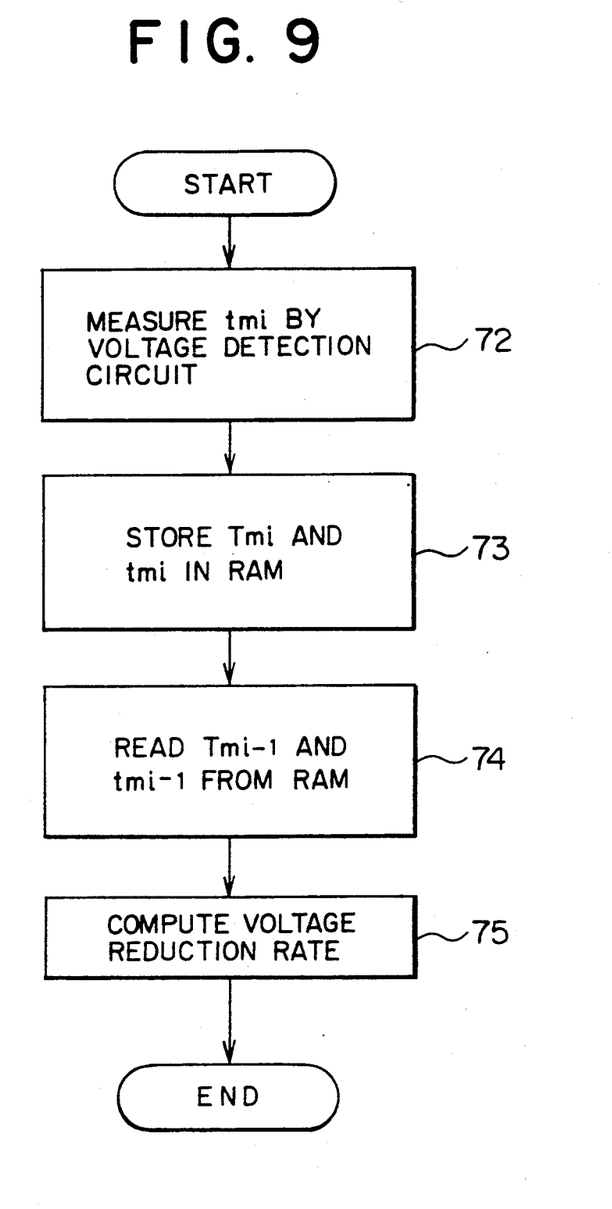
FIG. 9 is a flow chart illustrative of the operation of a sixth embodiment of the invention.

FIG. 9 is a flow chart showing a method for measuring the rate of reduction in the battery voltage in a sixth embodiment of the invention. In Step 72, the CPU 1 operates periodically or in accordance with an instruction from an external device (not shown) so as to enable the voltage detection circuit 9 to measure the time $t_{mi}$. The suffix i indicates an i-th cycle of measurement. This measurement is conducted in accordance with the flow chart shown in FIG. 3. In Step 73, the CPU 1 operates to record, in the RAM 3, the measured time value $t_{mi}$ obtained in Step 72 and the time $T_{mi}$ at which the measurement was conducted. Then, in Step 71, the CPU 1 reads the measured time value $t_{mi-l}$ and the measuring time $T_{mi-l}$ which were stored in the RAM 3 after the completion of preceding cycle of measurement, and computes the rate D of reduction of the battery voltage in accordance with the following formula in Step 75:

$$D = (t_{mi} - t_{m-1})/(T_{mi} - T_{mi-l})$$

By computing the rate D of reduction of the battery voltage, it is possible to detect a drastic drop of the battery voltage which occurs when the life of the battery 8 is going to expire. Thus, prediction of the life of the battery 8 is facilitated, so that the battery voltage can be detected with a higher degree of accuracy.

What is claimed is:

1. An IC card comprising:
    data transmission/receiving means for exchanging data with an external device;
    data processing means connected to said data transmission/receiving means for processing the data;
    a battery for supplying said data transmission/receiving means and said data processing means with electrical power;
    charge storage means charged at a predetermined time constant by said battery to produce an output voltage;
    charging control means for controlling the connection of said battery to said charge storage means in response to a control signal generated by said data processing means;
    comparator means for comparing the output voltage from said charge storage means with a reference value;
    time measuring means for measuring elapsed time from a moment when an electrical connection between said battery and said charge storage means is completed by said charging control means to a moment when said comparator means detects that the output voltage from said charge storage means exceeds the reference value;
    initial value setting means for setting an initial value in said time measuring means;
    overflow signal generating means for generating an overflow signal when the elapsed time exceeds a predetermined value; and
    alarm means for generating an alarm signal in response to the overflow signal generated by the overflow generating means.

2. An IC card according to claim 1 comprising alarm means for generating an alarm signal when the elapsed time measured by said time measuring means has exceeded a predetermined value.

3. An IC card according to claim 1 comprising mean value computing means for causing said time measuring means to measure the elapsed time for each of at least two consecutive connections of said battery and said charge storage means by said charging control means and for computing the means value of each of the elapsed times measured.

4. An IC card according to claim 1 comprising voltage reduction rate computing means for causing said time measuring means to measure the elapsed time for each of at least two consecutive connections of said battery and said charge storage means by said charging control means and for computing the rate of reduction of the voltage of said battery from the elapsed times measured.

5. An IC card according to claim 1, wherein said charge means, said charging control means, said comparator means and said time measuring means are formed in a signal semiconductor chip.

6. An IC card according to claim 1, wherein said charging control means include a transmission gate responsive to the control signal and connected between said battery and said charge storage means.

7. An IC card comprising:

data transmission/receiving means for exchanging data with an external device;
data processing means connected to said data transmission/receiving means for processing the data;
a battery for supplying said data transmission/receiving means and said data processing means with electrical power;
a plurality of charge storage means charged at different time constants by said battery to produce respective output voltages;
a transmission gate connected between said battery and said charge storage means for selectively connecting said battery to a respective charge storage means in response to a control signal from said data processing means;
comparator means for comparing the output voltage from the charge storage means connected to said battery by said charging means with a reference value; and
time measuring means for measuring elapsed time from a moment when an electrical connection between said battery and a respective charge storage means is completed by said transmission gate to a moment when said comparator means detects that the output voltage from the charge storage means connected to said battery exceeds the reference value.

8. An IC card comprising:
data transmission/receiving means for exchanging data with an external device;
data processing means connected to said data transmission/receiving means for processing the data;
a battery for supplying said data transmission/receiving means and said data processing means with electrical power;
charge storage means charged at a predetermined time constant by said battery to produce an output voltage;
charging control means for controlling the connection of said battery to said charge storage means in response to a control signal generated by said data processing means;
comparator means for comparing the output voltage from said charge storage means with a reference value;
time measuring means for measuring elapsed time from a moment when an electrical connection between said battery and said charge storage means is completed by said charging control means to a moment when said comparator means detects that the output voltage from said charge storage means exceeds the reference value; and
voltage reduction rate computing means for causing said time measuring means to measure the elapsed time for each of at least two consecutive connections of said battery and said charge storage means by said charging control means and for computing the rate of reduction of the voltage of said battery from the elapsed times measured.

* * * * *